US008955864B2

(12) United States Patent
Palen et al.

(10) Patent No.: US 8,955,864 B2
(45) Date of Patent: Feb. 17, 2015

(54) DOCKING STATION

(71) Applicant: AGCO Corporation, Duluth, GA (US)

(72) Inventors: Nelson J. Palen, Beloit, KS (US); Roger L. Meek, Beloit, KS (US); Bradley A. Stewart, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 282 days.

(21) Appl. No.: 13/632,341

(22) Filed: Oct. 1, 2012

(65) Prior Publication Data

US 2013/0082153 A1 Apr. 4, 2013

Related U.S. Application Data

(60) Provisional application No. 61/541,187, filed on Sep. 30, 2011.

(51) Int. Cl.
E02F 9/00 (2006.01)
A01B 59/00 (2006.01)
F16L 3/00 (2006.01)
E02F 9/22 (2006.01)

(52) U.S. Cl.
CPC ............... *A01B 59/00* (2013.01); *F16L 3/003* (2013.01); *E02F 9/2275* (2013.01)
USPC ............................ 280/421; 280/420; 280/434

(58) Field of Classification Search
USPC .......................................... 280/421, 420, 434
See application file for complete search history.

(56) References Cited

U.S. PATENT DOCUMENTS

| 2,180,048 | A | * | 11/1939 | Gurton et al. | 180/14.1 |
| 3,183,669 | A | * | 5/1965 | McGuire | 60/455 |
| 4,738,463 | A | * | 4/1988 | Poore et al. | 280/421 |
| 5,458,357 | A | * | 10/1995 | Wohlhuter | 280/420 |
| 5,623,959 | A | * | 4/1997 | Granmoe | 137/322 |
| 6,324,962 | B1 | * | 12/2001 | Majkrzak | 92/163 |
| 6,571,562 | B2 | * | 6/2003 | Wilcox | 60/779 |
| 6,622,646 | B1 | * | 9/2003 | Bennett et al. | 111/52 |
| 7,290,977 | B2 | * | 11/2007 | Albright et al. | 414/723 |
| 7,464,967 | B2 | * | 12/2008 | Mieger et al. | 285/124.5 |
| 8,187,020 | B2 | * | 5/2012 | Alguera Gallego et al. | 439/378 |
| 8,336,922 | B2 | * | 12/2012 | Tiberghien et al. | 285/124.3 |
| 2011/0037241 | A1 | * | 2/2011 | Temple et al. | 280/421 |
| 2012/0205907 | A1 | * | 8/2012 | Westendorf et al. | 285/120.1 |

* cited by examiner

Primary Examiner — Kevin Hurley
Assistant Examiner — Michael Stabley

(57) ABSTRACT

A hydraulically-operated implement has a hydraulic system with a hose and a coupler connecting the hose to a mating port on a tractor. A docking station is mounted on the implement receives the coupler on the free end of the hose when disconnected from the tractor. The docking station includes a station body having a coupler receiving portion and a leakage collection portion. The coupler receiving portion has a primary side with at least one circular bore and the leakage collection portion contains a drain opening. A retention device positioned on the inner periphery of each of the circular bores receives the coupler. The drain opening is sealed with a drain plug and the docking station has an inside bulkhead parallel with the primary side of the station body. The bulkhead has a circular hole formed therein aligned with the at least one cylindrical bore in the primary side.

20 Claims, 4 Drawing Sheets

DOCKING STATION

CROSS REFERENCE TO RELATED APPLICATIONS

This application claims priority to U.S. Provisional Application No. 61/541,187 filed Sep. 30, 2011, entitled "DOCKING STATION".

BACKGROUND OF THE INVENTION

1. Field of Invention

This invention relates generally to hydraulically operated implements used with tractors and, more specifically, to a docking station for holding the free end of hydraulic hoses when the implement is not connected to a tractor.

2. Description of Related Art

Agricultural and construction equipment utilize a number of hydraulic hoses which are attachable and detachable between a source of pressurized hydraulic fluid on a tractor vehicle and a trailing implement. The connection to the source is typically made utilizing standard quick connect couplers at one or both ends of the hydraulic hoses. While in use, one end of the hydraulic hose is coupled to the tractor and the other end is coupled to the implement so as to form a closed hydraulic loop. When it is time to separate the implement from the tractor, a coupler of the hydraulic hose is disconnected and the implement is unhitched. After being disconnected, it is possible for the free end of the hydraulic hose to contact the ground and become dirty. Any dirt that adheres to the oily surface of the coupler can later enter the hydraulic line and cause failure of the equipment.

To help prevent such problems, hydraulic hose retainers have been provided to hold the hydraulic hose up and away from the ground. Many of these prior art hose retainers suffered from two deficiencies; first, they do not fully shelter the end of the breakaway coupler, and second, they may require excessive force to insert the coupler into the hose retainer. Additionally, any leakage from the disconnected hose may leak to and contaminate the ground.

OVERVIEW OF THE INVENTION

In one embodiment, the invention is directed a hydraulically operated implement connectable with a tractor. The implement has a hydraulic system with at least one hose with a coupler at an end of the hose for releasably connecting the hose to a mating port on the tractor. A docking station is mounted on the implement for receiving the coupler on the free end of the hose when disconnected from the tractor. The docking station includes a station body having a coupler receiving portion and a leakage collection portion. The coupler receiving portion has a primary side with at least one circular bore and the leakage collection portion contains a drain opening. A coupler retention device configured to receive the coupler is positioned on the inner periphery of each of the circular bores. The docking station also has a drain plug sealing the drain opening and a bulkhead inside the docking station substantially parallel with the primary side of the station body. The bulkhead has at least one circular hole formed therein aligned with the at least one cylindrical bore in the primary side.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the implement.

Figure 1:
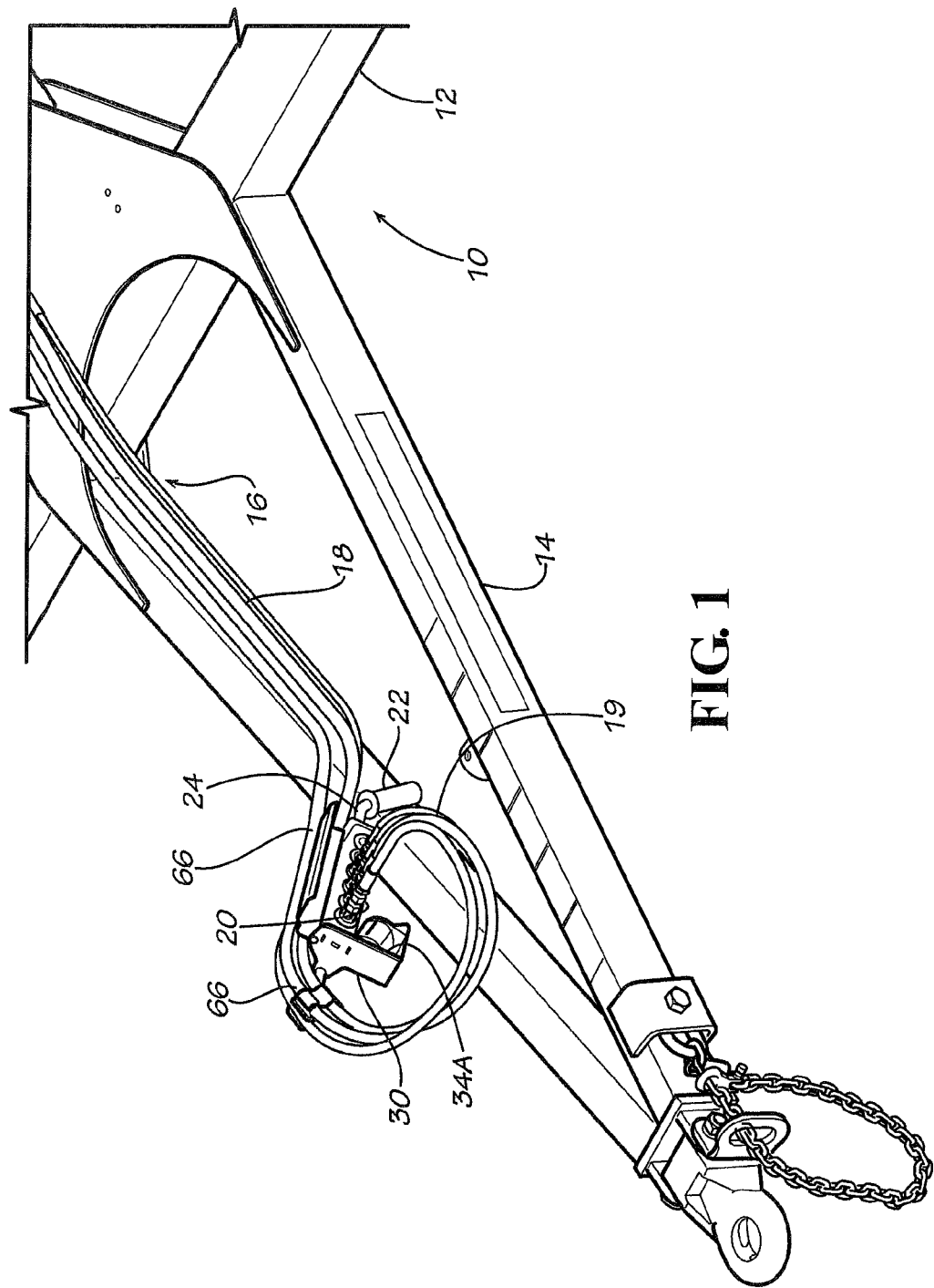
FIG. 1 is a perspective view of an implement having a docking station according to an embodiment of the invention.

Referring now to the drawings, and particularly to FIG. 1, a portion of a tillage implement 10 is shown having a main frame 12 with a forward tongue 14 adapted for connection to a tractor (not shown) such as is common on agricultural and construction implements. The implement 10 includes a hydraulic system indicated generally at 16 necessary for operation of the implement 10 such as for raising and lowering the frame between field-working and transport positions, for adjusting the working depth of the implement 10 and for folding and unfolding wing sections. While the example embodiment is a tillage implement 10, one skilled in the art will understand that the invention herein described may be used with any implement configured to be coupled with a tractor. The hydraulic system 16 includes a plurality of hydraulic hoses 18. The hoses 18 have input ends 19 with cylindrically shaped couplers 20 attached thereto for releasibly connecting the hoses 18 to female mating ports (not shown) on the tractor. Additionally, couplers 20 may attach other fluid systems between the implement 10 and the tractor. Each coupler 20 preferably is of conventional design, such as a standard quick connect coupler, and need not be described herein in further detail. When the couplers 20 are disconnected from the tractor, there is an amount of free length in the associated hose 18.

A hose stand indicated generally at 22 includes an upright post 24 connected at its lower end by welding or other suitable connectors to a portion of the hitch 14. A docking station 30 is mounted to the hose stand 40. The docking station 30 holds the couplers 20 of disconnected hoses 18 in a clean environment when the implement 10 is not connected to the tractor such as in storage or transit. While the illustrated embodiment is shown on implement 10, one skilled in the art will understand that the docking station 30 may also be mounted and used on the tractor as well.

Figure 2:
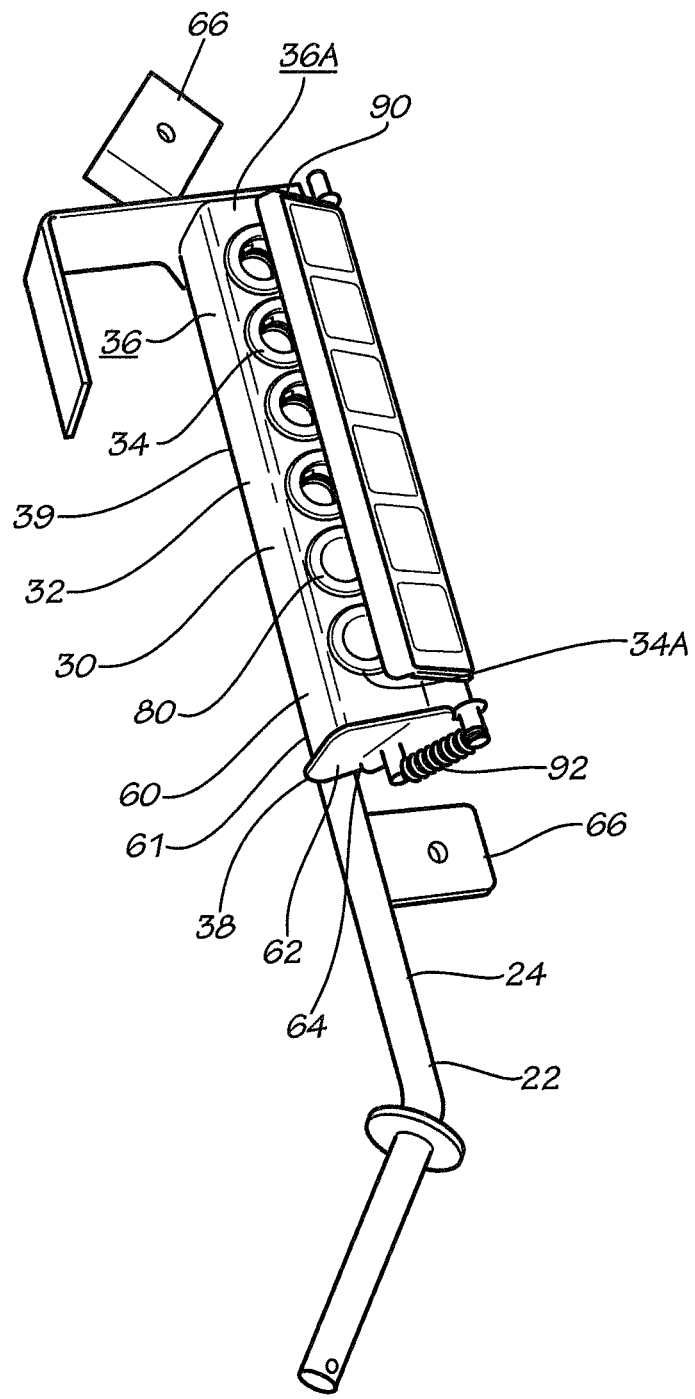
FIG. 2 is an enlarged perspective view of the docking station of FIG. 1.
Figure 3:
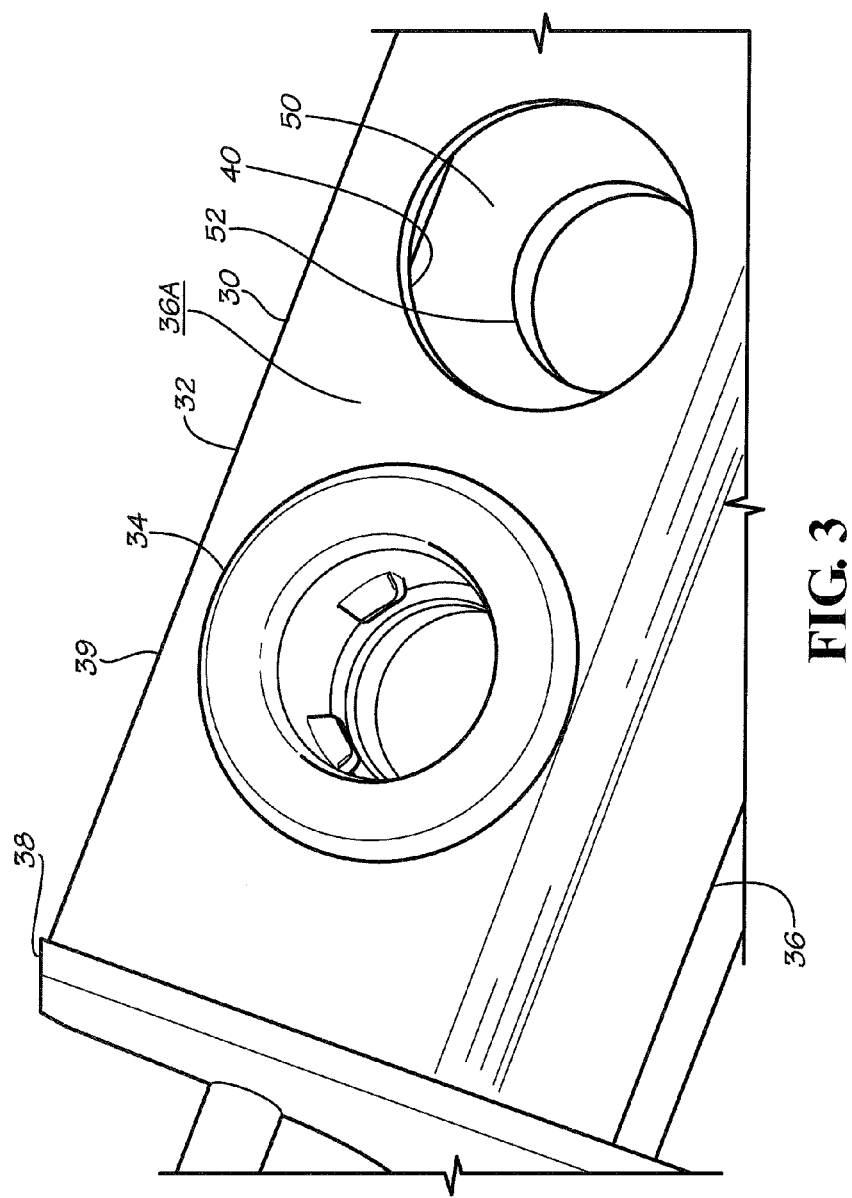
FIG. 3 is an enlarged view of circular bores in the docking station that receive coupler retention devices.

Turning now to FIG. 2, the docking station 30 is formed of a station body 32 and at least one coupler retention device 34. The illustrated embodiment, the station body 32 of the docking station 30 is made from square tubing with four sides 36 and sealed end plates 38 at either end. However, one skilled in the art will understand that other shapes and dimensions for the station body 32 may be used without departing from the scope of the invention. As best seen in FIG. 3, a coupler receiving portion 39 of the station body has a primary side 36A that contains at least one circular bore 40 configured to receive coupler 20. Desirably, there are at least as many circular bores 40 as there are hoses 18 and couplers 20 on the implement 10. Each circular bore 40 has a diameter slightly greater than the diameter of the coupler 20 and receives a coupler retention device 34. The coupler retention device 34 simulates female mating port for accepting and retaining the male couplers 20 on hoses 18 extending from the implement 10.

There is a bulkhead 50 inside the docking station 30 substantially parallel with the primary side 36A of the station body 32. The bulkhead 50 has circular holes 52 formed therein that align with the cylindrical bores 40 in the primary side 36A. The bulkhead 50 is spaced from the primary side 36A a distance such that tips of the couplers extend into the circular holes 52 such that the bulkhead 50 provides additional support for the coupler 20 when it is inserted into the docking station 30.

A lower end 60 of the docking station 30 forms a leakage collection portion 61 and has a drain opening 62 configured to be closed with a suitable drain plug 64. The docking station 30 is mounted on the hose stand 22 to be at an angle such that any leakage of hydraulic fluid will accumulate and be contained in the leakage collection portion 61 and can be drained as needed by unplugging the drain opening 62 and transferring the leakage to a suitable container rather than having the leakage drip to the ground from the disconnected hose couplers 20.

Desirably, the docking station 30 also has a plug retention device 34A (34A) configured to receive an electrical plug on an electrical line of the implement 10. Additionally, the post 42 may support a hose confining device 66 that loosely holds the hoses 18 above the hitch 14 during field operations, during transport, and while the implement 10 is parked.

Figure 4:
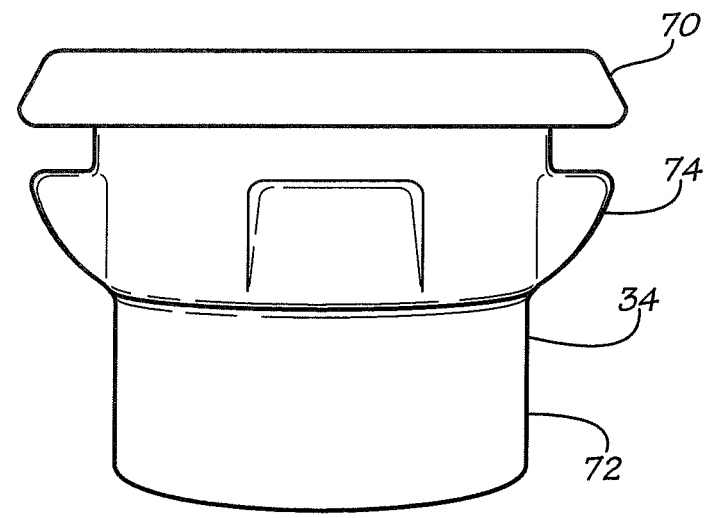
FIG. 4 is a side view of a coupler retention device.
Figure 5:
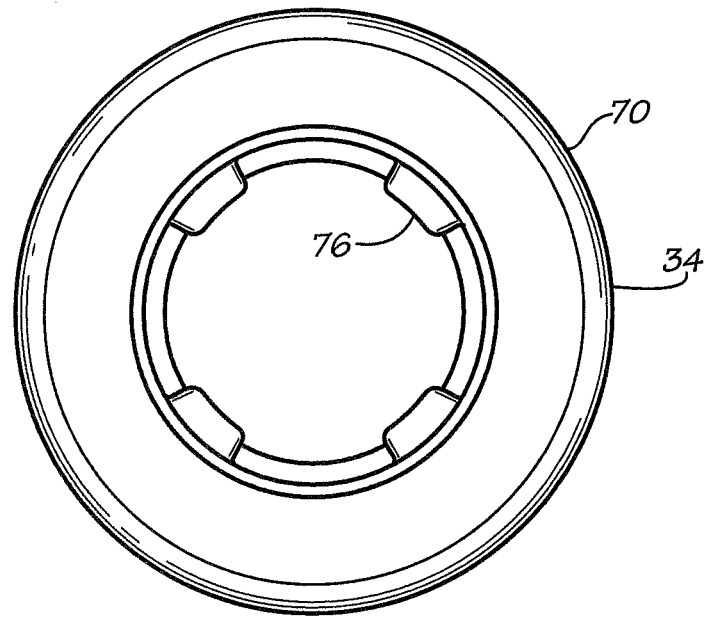
FIG. 5 is a plan view of a coupler retention device.

As best seen in FIG. 3, the coupler retention device 34 of the docking station 30 is positioned on the inner periphery of the circular bore 40. The coupler retention device 34 is positioned to securely contact the outer periphery of the coupler 18 in order to hold the coupler 18 snuggly within the circular bore 40. Turning to FIGS. 4 and 5, in one embodiment, the coupler retention device 34 is a grommet having an upper coupler-receiving rim 70 and a cylindrical body 72. In one embodiment, outward-extending tabs 74 extend out from the cylindrical body 72 to lock the coupler retention device 34 in the circular bores 40 of the station body 32. The coupler retention device 34 is desirably made of a flexible material. Additionally, the cylindrical body 72 may have inward facing tabs 76 that interact with the coupler 20, such as an annular ring on the coupler 20, to retain the coupler 20 in the retention device 34. The inward facing tabs 76 have sufficient rigidity so that they help retain the coupler 20 in the retention device 34, but permit the coupler 20 to be removed when a suitable force is applied to the hose 18. The retention device 34 may also be a flexible expandable ring, a spring-loaded device, or other type of engageable and disengageable device.

In the illustrated embodiment of FIG. 1, the docking station 30 has six circular bores 40 and retention devices 34, but one skilled in the art will understand that the number of retention devices 34 can be selected based upon the requirements of the implement 10. One or more of the retention devices 34 may be closed with a blind grommet 34A in the case when not all storage locations are needed. The blind grommet 34A has a blanking membrane 80 over its central opening to keep dirt from entering the docking station 30 through an unused retention device 34. The blind grommets 34A are made such that the blanking membrane 80 may be removed, such as by cutting with a knife, should the retention device 34 need to be used. Desirably, the blind grommets 34A are received in circular bores 40 closest to the leakage collection portion 61 of the docking station 30 and form a substantially fluid-tight seal with the station body 32 so as to maximize the capacity of the leakage collection portion 61 of the docking station 30.

Desirably, a lid 90 covers the retention devices 34 when couplers 20 are removed from the docking station 30 to protect the retention devices 34 from dirt and debris during field operation. In one embodiment, the lid 90 is spring loaded with a suitable biasing device 92 and is designed to be closed when the implement 10 and hoses 18 are connected to the tractor. The lid 90 may also act as a retaining device for the couplers 20 when the lid 90 is partially closed over the installed couplers 20. In the illustrated embodiment, the lid 90 covers all of the retention devices 34 in the docking station 30. However, one skilled in the art will understand that each retention device 34 may have its own individual lid 90. In one embodiment, the lid 90 may be made integral with the retention device 34 such as with a living hinge.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. In a hydraulically operated implement connectable with a tractor, the implement having a forward tongue adapted for connection to a tractor and a hydraulic system with at least one hose with a coupler at an end of the hose for releasably connecting the hose to a mating port on the tractor, the improvement comprising a hose stand connected at its lower end to a portion of the forward tongue and a docking station mounted on the implement for receiving the coupler on the free end of the hose when disconnected from the tractor, wherein the docking station is mounted to the hose stand, the docking station comprising:

a station body having a coupler receiving portion and a leakage collection portion, wherein the coupler receiving portion has a primary side with at least one circular bore and the leakage collection portion contains a drain opening;

at least one coupler retention device positioned on the inner periphery of the at least one circular bore, said at least one coupler retention device configured to receive said coupler; and a drain plug sealing the drain opening.

2. The implement of claim 1 wherein the docking station is mounted on the hose stand at an angle such that any leakage of hydraulic fluid accumulates and is contained in the lower end.

3. The implement of claim 1 further comprising a bulkhead inside the docking station substantially parallel with the primary side of the station body, the bulkhead having at least one circular hole formed therein aligned with the at least one cylindrical bore in the primary side.

4. The implement of claim 1 wherein each circular bore has a diameter slightly greater than the diameter of the coupler and receives the coupler retention device.

5. The implement of claim 1 wherein the docking station further comprises a plug retention device configured to receive an electrical plug.

6. The implement of claim 1 further comprising at least one coupler retention device closed with a blanking membrane over its central opening.

7. In a hydraulically operated implement connectable with a tractor, the implement having a hydraulic system with at least one hose with a coupler at an end of the hose for releasably connecting the hose to a mating port on the tractor, the improvement comprising a docking station mounted on the implement for receiving the coupler on the free end of the hose when disconnected from the tractor, the docking station comprising:
- a station body having a coupler receiving portion and a leakage collection portion, wherein the coupler receiving portion has a primary side with at least one circular bore and the leakage collection portion contains a drain opening;
- at least one coupler retention device positioned on the inner periphery of the at least one circular bore, said at least one coupler retention device configured to receive said coupler;
- a drain plug sealing the drain opening; and
- a lid covering the retention devices when couplers are removed from the docking station.

8. The implement of claim 7 further comprising a bulkhead inside the docking station substantially parallel with the primary side of the station body, the bulkhead having at least one circular hole formed therein aligned with the at least one cylindrical bore in the primary side.

9. The implement of claim 7 further comprising a forward tongue adapted for connection to a tractor, wherein the docking station is mounted on the forward tongue.

10. The implement of claim 7 further comprising a biasing device configured to bias the lid into the closed position when the coupler retention devices are free of couplers.

11. The implement of claim 7 wherein the lid is a retaining device when couplers are installed in the coupler retention devices.

12. The implement of claim 7 wherein each circular bore has a diameter slightly greater than the diameter of the coupler and receives the coupler retention device.

13. The implement of claim 7 wherein the docking station further comprises a plug retention device configured to receive an electrical plug.

14. The implement of claim 7 further comprising at least one coupler retention device closed with a blanking membrane over its central opening.

15. The implement of claim 7 wherein the docking station further comprises a plug retention device configured to receive an electrical plug.

16. The implement of claim 7 further comprising at least one coupler retention device closed with a blanking membrane over its central opening.

17. In a hydraulically operated implement connectable with a tractor, the implement having a hydraulic system with at least one hose with a coupler at an end of the hose for releasably connecting the hose to a mating port on the tractor, the improvement comprising a docking station mounted on the implement for receiving the coupler on the free end of the hose when disconnected from the tractor, the docking station comprising:
- a station body having a coupler receiving portion and a leakage collection portion, wherein the coupler receiving portion has a primary side with at least one circular bore and the leakage collection portion contains a drain opening;
- at least one coupler retention device positioned on the inner periphery of the at least one circular bore, said at least one coupler retention device configured to receive said coupler, wherein the at least one coupler retention device has an upper coupler-receiving rim and a cylindrical body with tabs extending outwardly from the cylindrical body configured to lock the coupler retention device in the at least one circular bore of the station body; and
- a drain plug sealing the drain opening.

18. The implement of claim 17 wherein the cylindrical body has inward facing tabs configured to interact with the coupler an annular ring on the coupler to retain the coupler in the retention device.

19. The implement of claim 17 further comprising a bulkhead inside the docking station substantially parallel with the primary side of the station body, the bulkhead having at least one circular hole formed therein aligned with the at least one cylindrical bore in the primary side.

20. The implement of claim 17 wherein each circular bore has a diameter slightly greater than the diameter of the coupler and receives the coupler retention device.

* * * * *